Nov. 11, 1924. 1,515,350
J. LUNDGREN
DYNAMIC AND STATIC BALANCING MACHINE
Filed Feb. 25, 1918 6 Sheets-Sheet 3

INVENTOR.
Jacob Lundgren,
By J. Stuart Freeman,
ATTORNEY.

Nov. 11, 1924.

J. LUNDGREN 1,515,350

DYNAMIC AND STATIC BALANCING MACHINE

Filed Feb. 25, 1918    6 Sheets-Sheet 5

INVENTOR.
Jacob Lundgren,
By J. Stuart Freeman,
ATTORNEY.

Patented Nov. 11, 1924.

1,515,350

UNITED STATES PATENT OFFICE.

JACOB LUNDGREN, OF PHILADELPHIA, PENNSYLVANIA, ASSIGNOR TO CARLSON-WENSTROM COMPANY, A CORPORATION OF DELAWARE.

DYNAMIC AND STATIC BALANCING MACHINE.

Application filed February 25, 1918. Serial No. 219,066.

*To all whom it may concern:*

Be it known that JACOB LUNDGREN, a citizen of the United States, residing at Philadelphia, in the county of Philadelphia and State of Pennsylvania, has invented certain new and useful Improvements in Dynamic and Static Balancing Machines, of which the following is a specification.

This invention relates to dynamic and static balancing machines and has for one of its particular objects the provision of a single machine, whereby both kinds of balance are obtained, and particularly without necessitating an alteration of either the body being balanced or the balancing means.

There is in the art a machine which provides an oscillatory base adapted to vibrate with but one degree of freedom and upon which is mounted a rotatable support for a body to be tested, a balancing unit, means to rotate said support and said unit synchronously, the axis of rotation of said unit being permanently in the plane of oscillation of said base, and means to shift the axis of rotation of said support from a position also in the plane of oscillation of said base to obtain dynamic balance, into a position perpendicular to said plane of oscillation of said base to obtain static balance.

However, there are certain devices that are difficult to shift from one position to another for obtaining these two types of balance, which fact makes an improvement thereover advisable, as well as its being very difficult in such a machine to perfectly construct the necessary turntable, or similar mechanism, for mounting an object to be tested in interchangeable positions.

Among the devices which demand a different kind of arrangement are the various types of separate bowls, bucket wheels for hydraulic pumps, motors, and the like. Such articles may be balanced absolutely in a dynamic or static balancing machine and retain such characteristic when run in the machines for which they may be designed, but when liquids are admitted into the latter these same balanced rotors may cause a vibration of the machines of which they form a part, this by virtue of the unequal or unevenly distributed pressure of the liquid against them.

Accordingly, as for instance in the case of cream separators, it has been found necessary to both statically and dynamically balance the bowls while running in liquid for which they are designed, or one similar thereto, and to so balance said bowls in the same position as that assumed in practice, which obviously is that having a vertical axis. Therefore, as it is also disadvantageous to shift the axis or position of the balancing unit, means has been provided to both dynamically and statically balance any desired article upon the same machine, in the same position of its axis, and without shifting the position or axis of said balancing unit.

These and further objects and details of the construction and operation of the invention in its preferred forms are fully brought out in the following description when read in conjunction with the accompanying drawings, in which Fig. 2 is a top plan view of the same.

Referring to Figs. 1 to 6, inclusive, of the drawings, one of the two preferred embodiments of this invention herein described comprises a hollow base portion 1 designed to rest upon the floor or any other suitable foundation to which it may be readily and rigidly secured by suitable attaching means passing thru a horizontally extending base flange 2, while said member is preferably provided with one or more large openings 3 for the purpose of obtaining ready access when desired to the mechanism positioned within said member, said opening being normally closed by means of detachable plates 4.

Adjacent to one end of the uppermost portion of said member 1 is secured an intermediate oscillatory member 5 in transverse cross-section having the form of an inverted U, and in length and width being substantially the same as the corresponding dimensions of said first-named member to which said last-named member is preferably secured by means of a yielding spring or other suitable member 6, while at one or more points, directly opposite to said yielding member, the member 5 cooperates with the base member 1 and rests upon the latter thru the medium of spaced compression coil-springs 7. These cooperating relatively oscillatory members, furthermore, are adapted to be interlocked to prevent relative movement therebetween by means of a suitable latch member 8, provided with a handle 9 for the sake of convenience and pivotably secured at 10 to the member 1, while the oppositely positioned walls of a recess 11 within said latch member are adapted to partially surround and, while in such position, to continuously cooperate with the shank of a pin or stud 12 carried by said oscillatory member 5.

A second oscillatory member 15 is provided with a suitable support 16 for a body (not shown) to be balanced, by which member said support is rotatably carried by means of spaced bearings 17 thru which it is journalled. Said member 15 in transverse cross-section also resembling an inverted U and comprises in addition to that portion which carries the support 16, a relatively narrower elongated extension 18, which extends into and thru the greater part of the length of the first-named oscillatory member 5, to one transverse edge portion of which the member 15 is secured by means of a yielding pivotable member 19, while at their transversely opposite edge portions said members 5 and 15 cooperate for relative movement between them by means of one or more resilient members, each of which in this case preferably comprises pairs of spaced coil-springs 20, surrounding pins 21 and adjustably tensioned by means of nuts 22, each of said pins being secured to the member 5 but passing slidably thru suitable apertures in the member 15, the adjacent portion of which latter is positioned between the coil-springs of each of the pairs. Said members 5 and 15, furthermore, may be interlocked against relative oscillation by means of a latch 23, pivotally carried by the latter of said members at 24, and provided with a convenient handle 25 and with a recess 26, the oppositely positioned walls of which recess being adapted to continuously cooperate with a suitable pin or stud 27 carried by the former of said members.

In the form of the device here being described, a suitable electric motor 30 is mounted rigidly upon the underside of the oscillatory member 15, and by means of cooperating bevel-gears 31 is operative to drive at any desired speed the support 16 for the body to be balanced, the said support shown in the figures referred to being particularly adapted for the balancing of rotatable members designed to revolve about vertically extending axes, as for instance, in such cases as the bowls of cream-separators, in order that such bowls can be balanced in their normally operative position and while operatively mounted with the cream-separator. This has been found in such and similar cases to be not only desirable but necessary, in view of the fact that perfect balancing, both dynamically and statically, of a separator-bowl, unassociated with any of the stationary parts of a separator and the liquid which it is designed to separate, may be accomplished with entire satisfaction when mounted alone in a balancing machine, yet, when mounted in and associated with its native elements, more or less violent vibration may be apparent by reason of the fact that forces external to the body of the bowl itself are brought into play, particularly by reason of its contact with the milk and cream and thru them with the stationary parts of the separator. Wherefore, it has been found necessary to balance said bowls when running under exactly the same conditions as those for which they are intended, in which case they may be so finely balanced, both dynamically and statically, as to run without any vibration being perceptible even by the most delicate instruments when mounted and running in commercial use.

The shaft 32 of the motor 30 has keyed thereto a gear 33 which meshes with a pinion 34, revolvably mounted within a worm-wheel 35 by means of a pin 36, upon the opposite end of which is fixedly secured a pinion 37, meshing with the internal gear 38 of a casing 39, secured in turn to one end of the shaft 40, said worm-wheel being mounted to revolve within the annular recess 41 of a bracket 42, rigidly secured to the underside of the oscillatory member 15 and provided at one end of said annular recess 41 with an integral flange 43, oppositely positioned to which is a removable flange 44. This construction comprises a simple, yet highly efficient, form of differential gear mechanism, the worm-gear 35 being revolved in either direction as may be desired by means of a worm 45, carried upon and secured to a vertically extending shaft 46, and positioned between horizontally extending, parallel, spaced shoulders 47 and 48, while upon the end of said shaft is secured a hand-wheel 49. Any movement of the said hand-wheel, in either clockwise or counter-clockwise direction and for the purpose hereinafter described, is indicated by a dial 50, revolvably supported by a yoke or spider 51 carried by the oscillatory member 15, said dial being connected to revolve upon every movement of the hand-wheel 49 by means of a train of gears 52, and to indicate the movement of said wheel by relation to a pointer 53 fixedly secured to the oscillatory member 5, thru an annular opening 54 of which said dial is constantly visible.

Additionally carried by and upon the underside of the oscillatory member 15 are spaced parallel hangers 60, thru which is journalled the shaft 40, which latter is slidably provided with a pair of collars 61 keyed thereto and adapted to be either brought together or separated while the shaft 40 is either stationary or in motion. Said collars 61 are provided upon their adjacent faces with parallel, radially extending planular discs 62, one of said discs being additionally provided with a longitudinally extending weight section 63 upon one transverse portion thereof, while the other of said discs is provided with an identical over-hanging weight section 63', in an exact and diametrically opposite position to said section 63, each of said sections being adapted to over-hang the adjacent portion of the other planular disc 62, when said collars are brought together in closest proximity and in which position said weight sections are adapted to revolve in the same identical plane, but out of which common plane their respective planes of revolution will emerge, as and when the said collars are moved simultaneously in opposite directions upon the shaft 40.

The hangers 60, furthermore, rotatably support a right and left threaded rod 64, upon each of the two threaded sections of which is provided an internally threaded sleeve 65, which latter in turn is provided with spaced fingers 66, so positioned as to partially surround the respective neighboring collars 61 and extend between and constantly cooperate with the adjacent faces of a pair of radially extending flanges 67 integrally carried by each of said sleeves.

Upon one end of the rod 64 is secured a bevel-gear 68, which meshes with a similar gear secured to the lower end portion of a vertically extending shaft 69 revolvably mounted adjacent to the innermost end portion of the oscillatory member 15, and extending upwardly thru an aperture 70 in the oscillatory member 5, while upon its uppermost portion is mounted a hand-wheel 71. The shaft 69 also carries a worm 72, operatively meshing with a worm-gear 73 secured to a shaft 74, which in turn is provided with a dial-wheel 75 and is journalled at its opposite ends in the transversely opposite sides of said oscillatory member 15, said dial-wheel being visible thru an opening 76 in the oscillatory member 5.

In the operation of this device, the hand-wheel 49 is so turned that the dial 50 shows a given point such as "0" or "360" beneath the pointer 53, in which position it is predetermined that the position of the weights 63—63' bear a known angular relation with the support 16. The hand-wheel 71 is also regulated so that the weight section 63—63' are in the position shown in Fig. 1, wherein they are adapted to revolve in a common plane, this position being indicated by the reading upon the dial-wheel 75. The body to be balanced is then secured in its characteristic position upon the support 16, and the latch member 8 made to lock the oscillatory member 5 against vibration with respect to the base member 1, while the members 5 and 15 are permitted to remain in oscillatory relation with respect to each other.

Figure 1:
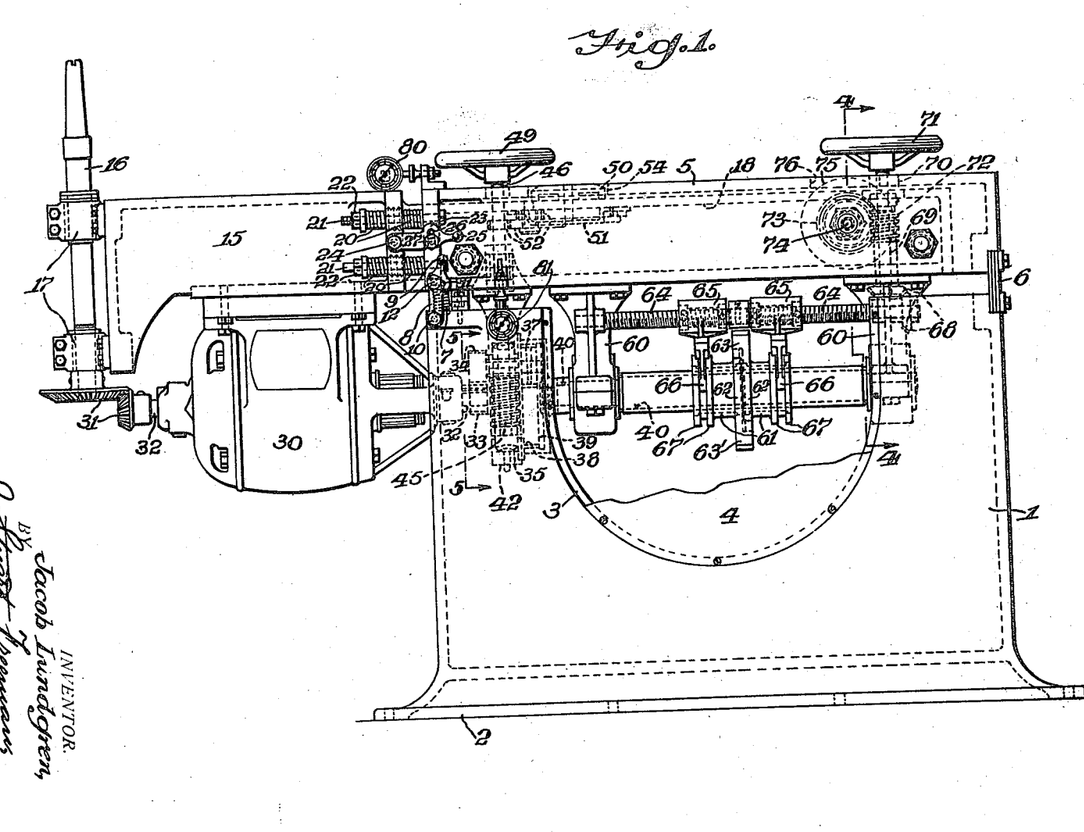
Fig. 1 is a side elevation of a combined dynamic and static balancing machine, operative to balance bodies designed to rotate about vertical axes.
Figure 3:
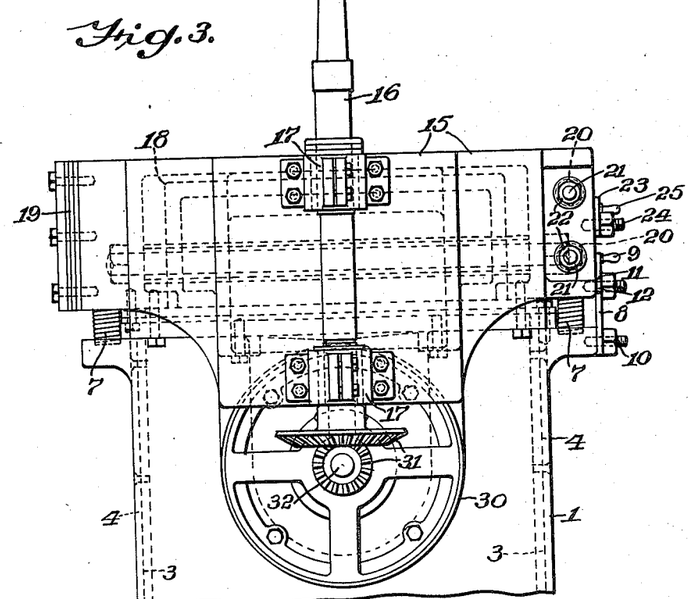
Fig. 3 is a left-end elevation of the same.
Figures 4, 5, 6:
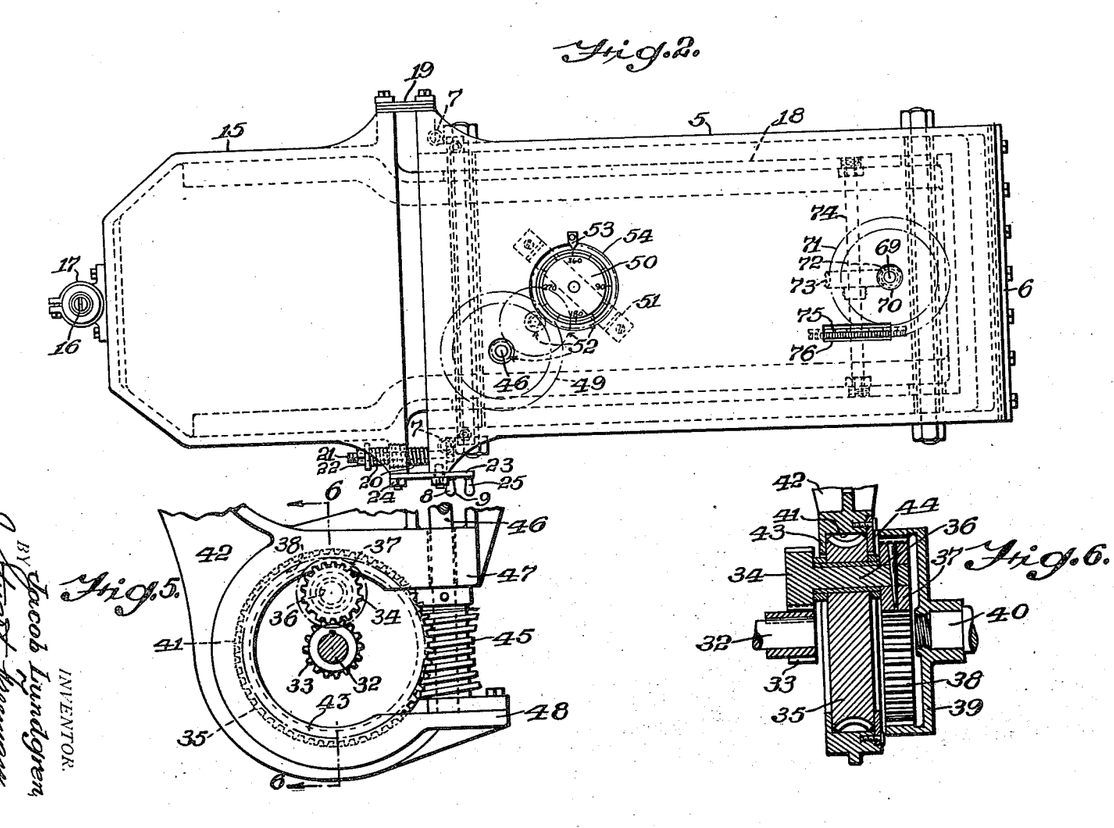
Fig. 4 is a section upon the line 4—4 of Fig. 1.
Fig. 5 is a section upon the line 5—5 of Fig. 1.
Fig. 6 is a section upon the line 6—6 of Fig. 5.
Figure 4:
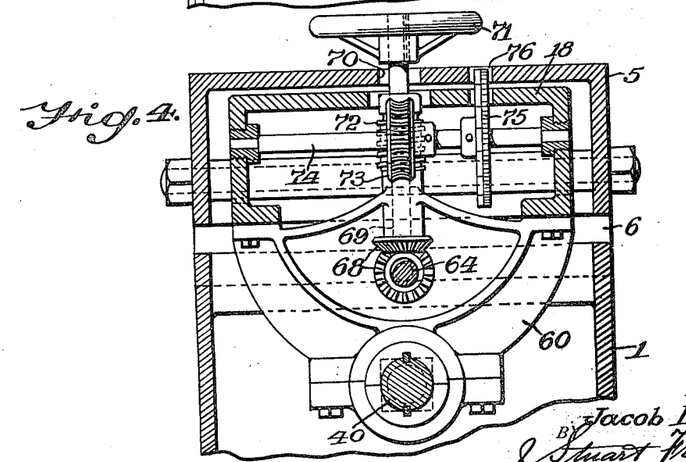

The motor 30 is then started to revolving and its speed gradually increased toward the rate at which the body upon the support is designed to rotate. If, however, the member 15 begins to vibrate, as indicated by the vibratometer 80, secured to and extending between the members 5 and 15, the hand-wheel 71 is so adjusted as to separate the planes of revolution of the weight sections 63—63' until a position is found at which said vibration is reduced to a minimum, after which the hand-wheel 49 is revolved in order to alter the angular relation between the position of said weight sections 63—63', with respect to the support 16 until a relationship is found at which all vibration between the members 5 and 15 ceases. Should these two adjustments alone be insufficient as described, either thereof may be continued while yet continuing the other, or in any sequence desired, until the angular position of said weights and the distance between their planes of revolution are so adjusted as to counteract all vibrating tendencies of the body being balanced, regardless of at what speed the same may be run. It is then possible to determine, preferably in ounce-inches, the exact position upon the body to be balanced from which an accurately computed amount of material should be removed in order to perfectly balance said body statically.

After this condition has been attained, either before or after the removal from or addition of material to the body in question in order to balance the same statically, the members 5 and 15 are locked by means of the latch 23, while the latch 8 is made to release the interlocking engagement of the base member 1 with the oscillatory member 5, after which the motor 30 is run as before described and the hand-wheels 49 and 71 are adjusted as in the previous instance, until such positions of the weights 63—63′ as to angular position and displacement are found as to counteract all tendency of the rotating body upon the support 16 to vibrate or oscillate the unitarily related members 5 and 15 with respect to the said base member 1, as indicated by the vibratometer 81 secured to and extending between each of the said members 5 and 1. When the correct positions of said weights 63—63′ are found, it is possible to accurately determine the exact position at which an exact predetermined amount of material may be added to, or removed from, the body upon the support 16 in order to finely balance the former dynamically, thus completing both the static and dynamic balancing of the body referred to, after which, if desired, the condition of exact balance may be proved by releasing either or both of the latches 8 and 23 separately or simultaneously, and revolving said body by means of the motor with the weight 63—63′ in the position shown in Fig. 1 of the drawings, that is, so over-lapping each other as to revolve in a common plane, and by continuing to revolve them while varying their angular position with respect to the body upon the support 16 by means of the hand-wheel 49.

Referring now to Figs. 7 to 11, inclusive, a modified form of the invention is shown with the particular object in view of providing for the accurate balancing, both statically and dynamically, of bodies designed to rotate upon horizontal axes. This machine comprises a base member 90, provided with a lower flange 91, thru which may be extended means for attaching the same to a suitable rigid foundation, while upon its uppermost surface said member 90 supports a hollow rectangular oscillatory frame member by means of one or more compression coil-springs 93 at one end of said member, while at the opposite end thereof they are connected and spaced with relation to each other by means of a resilient pivotal member 94, a suitable latch 95 being provided for the purpose of interlocking said members against relative movement when such is desirable, the same being pivotally mounted at 96 upon the member 90 and provided with a recess 97, the walls of which are adapted to partially surround and when in locked position to continuously contact with the sides of a pin or stud 98 carried by the member 92, while a suitable handle 99 is provided for the purpose of conveniently operating said latch.

A second oscillatory member 100, resembling in many ways a lathe bed, is pivotally mounted upon and adapted to oscillate, with respect to the member 92, by means of spaced resilient pivotal members 101 at the rear of the member 100 and adjacent to the opposite ends thereof, while at their forwardmost portions said members 100 and 92 are vibratively connected by means of compression coil-springs 102, while it is possible when desirable to interlock said members against relative movement by means of one or more similar latches 103 at the opposite ends of the device, said latches being exactly similar to those hereinbefore described and being pivotably connected at 104 to the member 92, and adapted to engage a pin or stud 105 carried by the bed 100, while they are operated by means of suitable handles 106.

Figure 7:
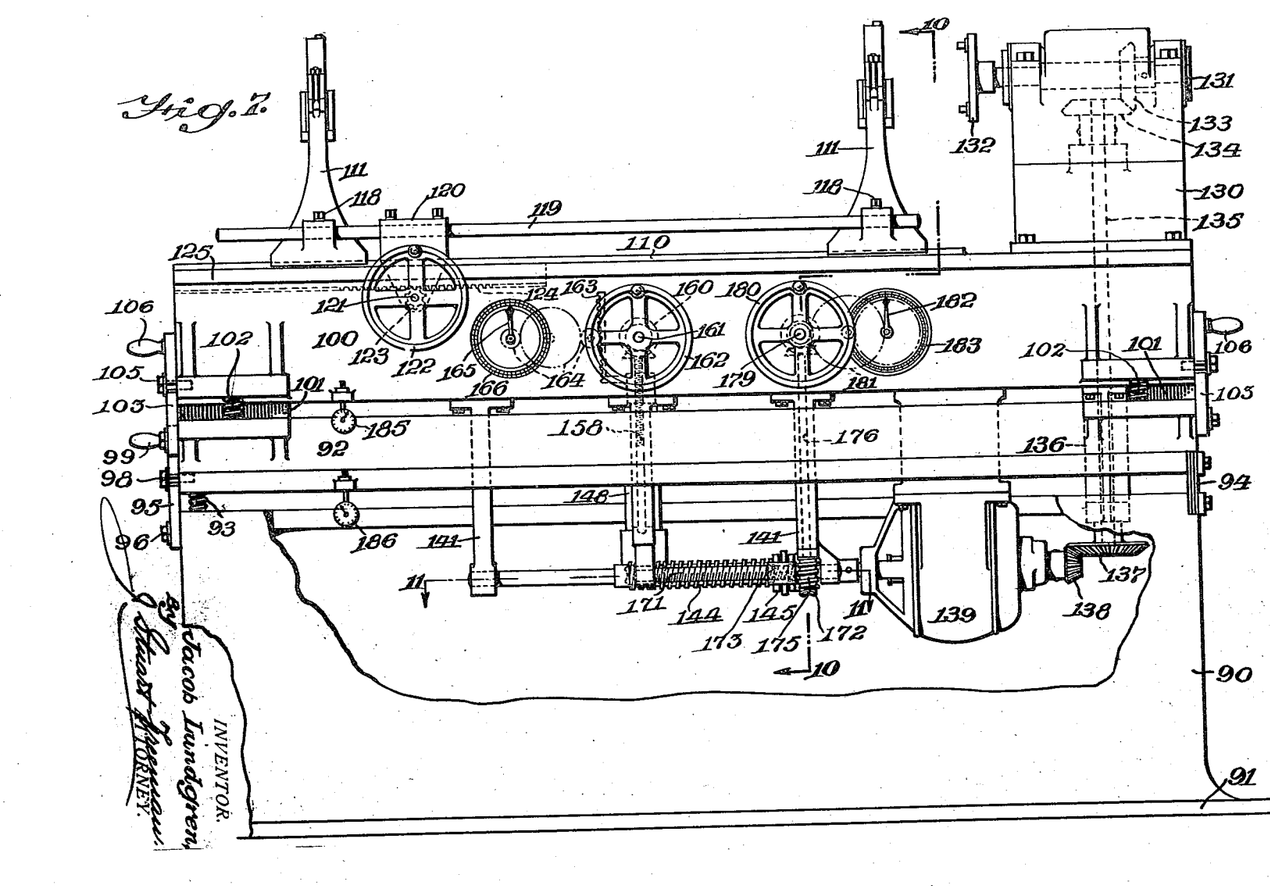
Fig. 7 is a front elevation of a modified form of the machine, operative to both dynamically and statically balance bodies designed to rotate upon horizontal axes.
Figure 8:
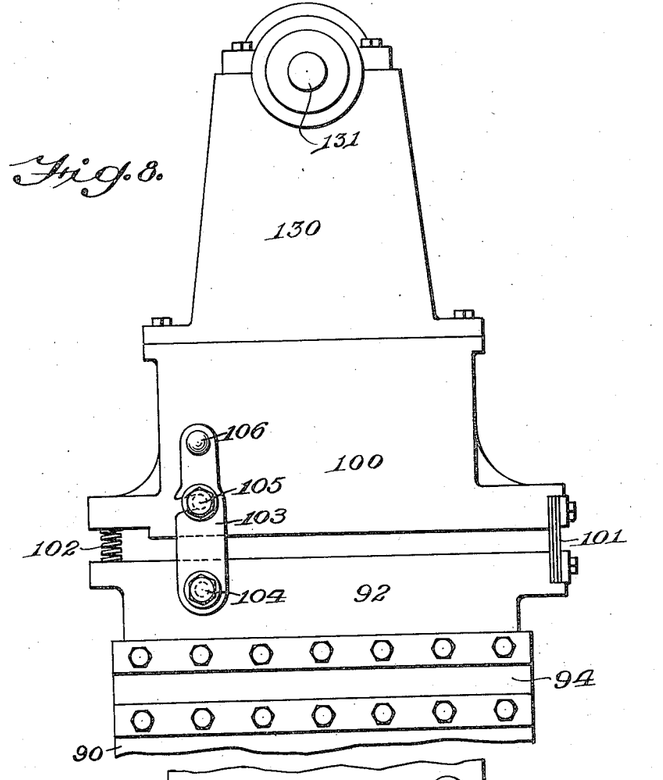
Fig. 8 is a right-end elevation of a portion of the same.
Figure 9:
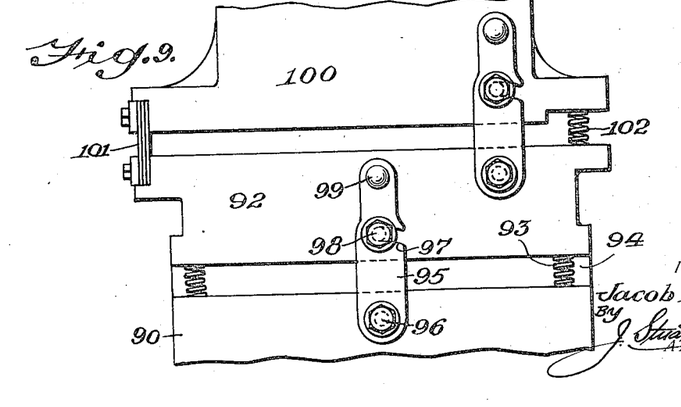
Fig. 9 is a left-hand elevation of the central portion of the same, showing the various resilient and locking members located upon that portion of the device.
Figure 10:
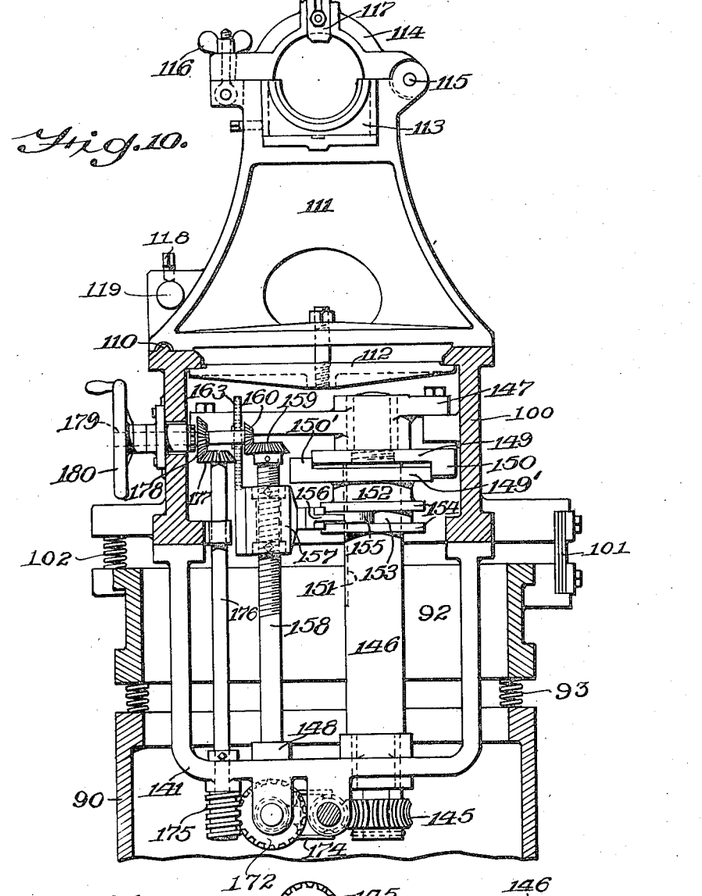
Fig. 10 is a section upon the line 10—10 of Fig. 7.

Upon the uppermost surface of the bed 100 is a suitable track 110, upon which is adapted to be longitudinally shifted as many work-rests 111 as may be desired, the same being removably secured to said bed by means of a spanner-clamp and bolt 112 as shown in Fig. 10, while the uppermost portions of said work-rests are recessed and removably provided with bearing-blocks 113, which same are adapted to receive and rotatably support the body to be balanced by the machine, or a suitable shaft upon which said body may be carried. For maintaining said body or its shaft within said bearing-blocks, an adjustable clamp 114 is provided, the same being pivotably connected at 115 to the rearmost portions of said rests, and at the forwardmost portions being adjustably secured in closed position by means of suitable bolts or thumb-nuts 116, and being further provided with vertically adjustable bearing-members 117. These work-rests may be moved independently of each other, or may be clamped by means of bolts 118 to a rod 119 extending thru them, said rod carrying a depending block 120, thru the lowermost portion of which is rotatably journalled a short shaft 121 carrying a hand-wheel 122 upon one end and a pinion 123 upon the other end, said pinion being arranged to engage and cooperate with a rack 124 carried by the underside of a horizontally extending flange 125, integral and in alignment with the upper portion of the bed 100. By this means, said rests may be clamped to the bar 119, and by means of the hand-wheel 122 said rests, together with any work which they may support, may be shifted as a unit longitudinally over the bed.

Also supported by the bed 100 and adjacent to one end thereof is a head-stock 130, in the upper portion of which is journalled a live spindle 131 adapted to carry any suitable face-plate 132 or other member for removably securing to said spindle the body to be balanced or a shaft upon which the same may be mounted. Said spindle is also provided with a bevel-gear 133, meshing with a second bevel-gear 134 carried by the adjacent end of a vertically extending shaft 135 which passes downwardly thru the head-stock, bed 100, oscillatory member 92, and into the hollow base member 90, being supported adjacent to its lowermost portion by means of a yoke 136 secured to the underside of and movable with the base member 100. The shaft 135 is provided at its lower end with a bevel-gear 138 carried by the shaft of the motor 139, which is also secured to the underside of and is movable with the base member 100, said motor being regulated in speed by any suitable mechanism, either mechanical or electrical (not shown).

Figure 11:
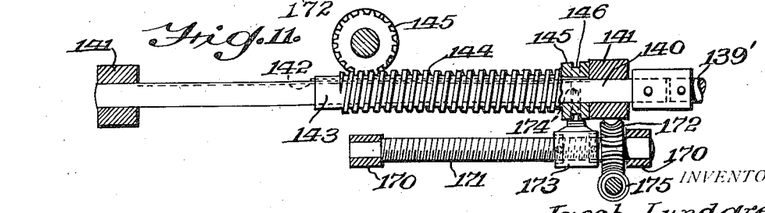
Fig. 11 is a section upon the line 11—11 of Fig. 7.

Referring to Figs. 10 and 11, the motor shaft 139' is illustrated as being coupled to a shaft 140, revolvably supported by spaced brackets 141, also secured to and movable with the said base member 100, said last-named shaft being provided with a key-way 142 and key by which it is operative to revolve the sleeve 143, provided with external worm-teeth 144, and with a collar 145 containing an annular groove 146. The worm 144 continuously meshes with a worm-gear 145, carried upon the lower end of a vertically extending shaft 146, supported by upper and lower brackets 147 and 148, both of which are centrally disposed with respect to the oscillatory bed 100. Fixedly secured to the shaft 146, and rotatable therewith, is a disc 149 provided at one point of its periphery with a weight section 150, while a second disc 149' is longitudinally movable upon the said shaft 146 and rotatable therewith by means of a key and key-way 151, and is itself provided with a weight section 150' exactly equal to the weight section 150. The disc 149' forms one part of a sleeve 152 which is also provided with a peripheral groove 153, bounded by a pair of radially extending flanges 154, between which extend the spaced fingers 155 of the yoke 156, carried by a block 157, which in turn is internally threaded and is adapted to be moved vertically by and upon a threaded bar 158, which latter is also supported by the bracket 148 and carries upon its upper end a bevel-gear 159, meshing with a bevel-gear 160, carried by a shaft 161, journalled thru the front face portion of the oscillatory base 100, and rotated by means of a hand-wheel 162.

The block 157 is also provided with an angularly extending rack member 163, which cooperates with a chain of gears 164, operative to revolve a shaft carrying a pointer 165, which indicates the slightest movement of said block by its relation to the graduation upon a dial-face 166, secured to or forming an integral part of the member 100. With this construction, while the shaft 146 is stationary or revolving, any rotation of the hand-wheel 162 will raise or lower the sleeve 152 so that when in its uppermost position the weight section 150—150' will be rotatable in a common plane, while with any movement of the sleeve 152 away from such position, the planes of revolution of said weight sections will separate to any extent directly proportional to the movement of said hand-wheel.

Supported by spaced bearings 170 forming extensions of the brackets 141 and 148, and carried by the oscillatory member 100, is a threaded shaft 171, to which is secured a worm-wheel 172, and upon which is mounted in threaded engagement a sleeve 173 provided with spaced fingers 174, which are positioned to slidably move within the groove 146 of the sleeve 143. Meshing with the worm-wheel 172 is a worm 175 carried by a vertically extending shaft 176, rotatably supported by one of the shafts 141, and at its uppermost portion being provided with a bevel-gear 177, meshing with a similar gear 178, carried by a shaft 179 which extends thru the front face portion of the said member 100, and has secured thereto a hand-wheel 180, while the shaft 179, by means of a chain of gears 181, actuates a pointer 182 which indicates its relative movement by its adjacency to the graduated dial-face 183, carried by or forming a part of the front face of said oscillatory base member 100. With this construction, any movement of the hand-wheel 180, in addition to being indicated by the pointer 182, is transmitted by means of a shaft 176 and worm and worm-wheel 175 and 172, respectively, to the threaded shaft 171, and thence to the block 172, which shifts the sleeve 143 longitudinally upon the motor-driven shaft 140, and regardless of whether said last-named shaft may be stationary or rotating, it being evident that such longitudinal movement of said sleeve will be imparted to the worm-wheel 145, thereby altering the angular relationship between the weight sections 150—150' upon the one hand carried by the shaft 146 and the work or work-carrying shaft supported by the said rests 111 upon the other, and driven by means of the motor 139 thru the coupling 132.

In the operation of this form of the device a body to be balanced is mounted upon the work-rests 111 as hereinbefore described, and the pointers 165 and 182 placed at "0" by means of the proper adjustment of the respective hand-wheels 162 and 180, thus indicating that the weight sections 150—150' are positioned to revolve in a common plane and are in a known angular relation with the face-plate 132 and therefore the body to be tested. Starting the motor 139 to revolve, and increasing the speed of the same as may be desired with the latch-member 95 securing the bars 90 and 92 against their relative movement, and with the latch members 103 released, the slightest lack of static balance within the body to be balanced will be indicated by means of the delicate vibratometer 185. If a vibration is thus indicated, the hand-wheel 162 is revolved until a relative position of the weight sections 150—150' is found to be indicated by the pointer at 165, at which the vibration of the member 100 is brought to a minimum, whereupon, the hand-wheel 180 is revolved in order to shift the relative angular position of the weight sections 150—150' with respect to the body being balanced, the exact extent of this change in relationship being directly indicated by the pointer at 182 upon its corresponding dial-faces. Carrying out this operation, a position will be found at which a definite angular relation between said weight sections and body being balanced and a definite relative position of the planes of rotation of the respective weight sections is found, at which all vibration of the member 100, caused by an imperfect static balance of the body being tested, will cease, whereupon, an exact location and an exact amount of material can be positively determined, as for instance in ounce-inches, by the removal of which material at such predetermined position a fine static balance will be given to the said body.

Either before correcting the static balance of said body by the removal from or addition thereto of material, the same may be given dynamic balance by releasing the latch 95 and by securing the latches 103, whereupon, revolving the said body by means of the motor 139 will, if a lack of dynamic balance exists, vibrate the interlocked members 92 and 100 with respect to the bed 90 the slightest relative movement of which portions of the mechanism will be positively indicated by means of the delicate vibratometer 186. Then, the hand-wheels 162 and 182 may be adjusted in the same manner as hereinbefore described until positions of them are found in which all vibration of the upper portion of the machine ceases, upon attaining which condition a reading of the respective dials will positively indicate, also if desired in ounce-inches, the exact position and extent to which material should be added to or removed from the body being tested in order to give to it a fine degree of dynamic balance.

Having thus described my invention, what I claim and desire to protect by Letters Patent of the United States is:

1. The method of balancing a body, which consists in rotatably mounting such body upon a member having two degrees of freedom and having rotatably mounted thereon a balancing unit adjustable to vary its dynamic balance, and then rotating the body and unit synchronously, suppressing one degree of freedom of said member, and adjusting said unit to counterbalance said body statically, then suppressing instead the other degree of freedom of said member, and then adjusting said unit to counterbalance said body dynamically.

2. The method of balancing a body, which consists in rotatably mounting such body upon a member having two degrees of freedom and having rotatably mounted thereon a balancing unit adjustable to vary its dynamic balance, and then rotating the body and unit synchronously, suppressing one degree of freedom of said member, and adjusting said unit to counterbalance said body statically, while said body and said unit are in motion, then suppressing instead the other degree of freedom of said member, and then adjusting said unit to counterbalance said body dynamically while said body and said unit are in motion.

3. A balancing machine, comprising an oscillatory member, means operative to restrain said member to oscillate in a single plane, resilient means to yieldingly position said member intermediate of its extreme limit of oscillation, a support for a body to be tested carried by said member, means operative to restrain said support to oscillate in a single plane with respect to said member, and at an angle with said first plane, so that said support possesses two degrees of freedom, and means to prevent the movement of either said member or of said support with respect to said member selectively.

4. A balancing machine, comprising an oscillatory member, a pivot mounting for said member operative to restrain said member to oscillate in a single plane, a support for a body to be tested carried by said member, a pivot connection between said support and said member operative to restrain said support to oscillate in a single plane with respect to said member and at an angle with said first plane, so that said support possesses two degrees of freedom, and means to restrain movement of said member, or of said support with respect to said member selectively or simultaneously.

5. A balancing machine, comprising an oscillatory member, means to restrain said member to oscillate in a single plane, resilient means to yieldingly position said member intermediate of its extreme limits of oscillation, a support for a body to be tested carried by said member, a pivot connection between said support and said member to restrain said support to oscillate in a single plane with respect to said member, thereby permitting a body carried by said support to oscillate with two degrees of freedom, and means to prevent the oscillation of either said member or of the support with respect to said member at will.

6. A balancing machine, comprising a base, a vibratory member, means connecting said member with said base, resilient means to yieldingly maintain said member in a predetermined relation with said base, a support for a body to be tested, means connecting said support with said member, resilient means to yieldingly maintain said support in a predetermined relation with said member, means to prevent either the oscillation of said member with respect to said base or of said support with respect to said member, either selectively or simultaneously, said first connecting means limiting the relative oscillation to a plane angularly disposed with that in which relative oscillation is limited by said second connecting means, and means to rotate a body carried by said support.

7. A balancing machine, comprising a base, a vibratory member, means pivotally connecting said member with said base, resilient means to yieldingly maintain said member in a predetermined relation with said base, a support for a body to be tested, means pivotally connecting said support with said member, resilient means to yieldingly maintain said support in a predetermined relation with said member, means to prevent either the oscillation of said member with respect to said base or of said support with respect to said member, either selectively or simultaneously, said first connecting means limiting the relative oscillation to a plane angularly disposed with that in which relative oscillation is limited by said second connecting means, and means to rotate a body carried by said support.

8. A balancing machine, comprising a base, a member pivotally carried by said base, a support for a body to be tested pivotally carried by said member, the plane of the pivot of one member being disposed at an angle to the plane of the pivot of the other member, and means to rotate a body carried by said support.

9. A balancing machine, comprising a base, a member pivotally carried by said base and limited to one degree of freedom, a support for a body to be tested pivotally carried by said member and limited to one degree of freedom with respect to said member, the plane of the pivot of one member being disposed at an angle to the plane of the pivot of the other member, and means to rotate a body carried by said support.

10. A balancing machine, comprising a base, a member oscillatable with respect to said base, a support for a body to be tested oscillatable with respect to said member, the plane of oscillation of said member being at an angle to the plane of oscillation of said support, balancing means oscillatable with said support, and means operative to rotate said balancing means and a body upon said support synchronously.

11. A balancing machine, comprising a base, a member oscillatable with respect to said base, a support for a body to be tested carried by and oscillatable with respect to said member, the plane of oscillation of said member being at an angle to the plane of oscillation of said support, balancing means also carried by and oscillatable with respect to said member and synchronously with said support, and means to rotate said balancing means and a body upon said support synchronously.

12. A balancing machine comprising a base, a member oscillatable with respect to said base, a support for a body to be tested carried by and oscillatable with respect to said member, balancing means also carried by and oscillatable with respect to said member and synchronously with said support, means to rotate said balancing means and a body upon said support synchronously, and means to adjust said balancing means while the latter is in motion.

13. A balancing machine, comprising a base, a member oscillatable with respect to said base, a support for a body to be tested carried by and oscillatable with respect to said member, the plane of oscillation of said member being at an angle to the plane of oscillation of said support, balancing means also carried by and oscillatable with respect to said member and synchronously with said support, means to rotate said balancing means and a body upon said support synchronously, and means to adjust the balance of said balancing member and its angular relation to a body upon said support while the same are in motion.

14. A balancing machine, comprising a base, an oscillatory member pivotally mounted upon said base, a member having a support for a body to be balanced pivotably mounted upon said oscillatory member, said members having the planes of their respective pivots at an angle to each other, a balancing unit carried by said member, and means also carried by said second member and operative to rotate a body upon said support and said unit synchronously.

15. A balancing machine, comprising a base, an oscillatory member pivotably mounted upon said base, a member having a support for a body to be balanced pivotably mounted upon said oscillatory member, said members having the planes of their respective pivots at an angle to each other, a balancing unit carried by said second member, means also carried by said second member and operative to rotate a body upon said support and said unit synchronously, and means to adjust said unit to balance a body upon said support while said unit and said body are in motion.

16. A balancing machine, comprising a base, an oscillatory member pivotably mounted upon said base, a member having a support for a body to be balanced pivotably mounted upon said oscillatory member, said members having the planes of their respective pivots at an angle to each other, a balancing unit carried by said second member, means also carried by said second member and operative to rotate a body upon said support and said unit synchronously, and means to alter the angular relation of said unit with respect to said body while the same are in motion.

17. A balancing machine, comprising a base, an oscillatory member pivotably mounted upon said base, a member having a support for a body to be balanced pivotably mounted upon said oscillatory member, a balancing unit carried by said member, the plane of the pivot of one member being disposed at an angle to the plane of the pivot of the other member, means also carried by said second member and operative to rotate a body upon said support and said unit synchronously, means to adjust said unit to balance a body upon said support while said unit and said body are in motion, and means to alter the angular relation of said unit with respect to said body while the same are in motion.

18. A balancing machine, comprising a base, an oscillatory member pivotably mounted upon said base, a member having a support for a body to be balanced pivotably mounted upon said oscillatory member, the planes of oscillation of said oscillatory member and said second member being perpendicular to each other, a balancing unit carried by said second member, and means also carried by said second member and operative to rotate a body upon said support and said unit synchronously.

19. A balancing machine, comprising a base, an oscillatory member pivotably mounted upon said base, a member having a support for a body to be balanced pivotably mounted upon said oscillatory member, the planes of oscillation of said oscillatory member and said second member being perpendicular to each other, a balancing unit carried by said second member, means also carried by said second member and operative to rotate a body upon said support and said unit synchronously, and means to adjust said unit to balance a body upon said support while said unit and said body are in motion.

20. A balancing machine, comprising a base, an oscillatory member pivotably mounted upon said base, a member having a support for a body to be balanced pivotably mounted upon said oscillatory member, the planes of oscillation of said oscillatory member and said second member being perpendicular to each other, a balancing unit carried by said second member, means also carried by said second member and operative to rotate a body upon said support and said unit synchronously, and means to alter the angular relation of said unit with respect to said body while the same are in motion.

21. A balancing machine, comprising a base, an oscillatory member pivotably mounted upon said base, a member having a support for a body to be balanced pivotably mounted upon said oscillatory member, the planes of oscillation of said oscillatory member and said second member being perpendicular to each other, a balancing unit carried by said second member, means also carried by said second member and operative to rotate a body upon said support and said unit synchronously, means to adjust said unit to balance a body upon said support while said unit and said body are in motion, and means to alter the angular relation of said unit with respect to said body while the same are in motion.

22. A balancing machine, comprising a base, an oscillatory member pivotably mounted upon said base, resilient means to yieldingly position the same, a member having a support for a body to be balanced pivotably mounted upon said oscillatory member, the plane of the pivot of one member being disposed at an angle to the plane of the pivot of the other member, resilient means to yieldingly position said second member, a balancing unit carried by said second member, and means also carried by said second member and operative to rotate a body upon said support and said unit synchronously.

23. A balancing machine, comprising a base, an oscillatory member pivotably mounted upon said base, a resilient means to yieldingly position the same, a member having a support for a body to be balanced pivotably mounted upon said oscillatory member, the plane of the pivot of one member being disposed at an angle to the plane of the pivot of the other member, resilient means to yieldingly position said second member, a balancing unit carried by said second member, means also carried by said member and operative to rotate a body upon said support and said unit synchronously, and means to adjust said unit to balance a body upon said support while said unit and said body are in motion.

24. A balancing machine, comprising a base, an oscillatory member pivotably mounted upon said base, resilient means to yieldingly position the same, a member having a support for a body to be balanced pivotably mounted upon said oscillatory member, the plane of the pivot of one member being disposed at an angle to the plane of the pivot of the other member, resilient means to yieldingly position said second member, a balancing unit carried by said second member, means also carried by said second member and operative to rotate a body upon said support and said unit synchronously, and means to alter the angular relation of said unit with respect to said body while the same are in motion.

25. A balancing machine, comprising a base, an oscillatory member pivotably mounted upon said base, resilient means to yieldingly position the same, a member having a support for a body to be balanced pivotably mounted upon said oscillatory member, the plane of the pivot of one member being disposed at an angle to the plane of the pivot of the other member, resilient means to yieldingly position said second member, a balancing unit carried by said second member, means also carried by said second member and operative to rotate a body upon said support and said unit synchronously, means to adjust said unit to balance a body upon said support while said unit and said body are in motion, and means to alter the angular relation of said unit with respect to said body while the same are in motion.

26. A balancing machine, comprising a base, an oscillatory member pivotably mounted upon said base, resilient means to yieldingly position the same, a member having a support for a body to be balanced pivotably mounted upon said oscillatory member, resilient means to yieldingly position said second member, the planes of oscillation of said oscillatory member and said second member being perpendicular to each other, a balancing unit carried by said second member, and means also carried by said member and operative to rotate a body upon said support and said unit synchronously.

27. A balancing machine, comprising a base, an oscillatory member pivotably mounted upon said base, resilient means to yieldingly position the same, a member having a support for a body to be balanced pivotably mounted upon said oscillatory member, resilient means to yieldingly position said second member, the planes of oscillation of said oscillatory member and said second member being perpendicular to each other, a balancing unit carried by said second member, means also carried by said member and operative to rotate a body upon said support and said unit synchronously, means to adjust said unit to balance a body upon said support while said unit and said body are in motion, and means to alter the angular relation of said unit with respect to said body while the same are in motion.

28. A balancing machine, comprising a base, an oscillatory member pivotably mounted upon said base, resilient means to yieldingly position the same, a member having a support for a body to be balanced pivotably mounted upon said oscillatory member, the plane of the pivot of one member being disposed at an angle to the plane of the pivot of the other member, resilient means to yieldingly position said second member, a balancing unit carried by said second member, means also carried by said second member and operative to rotate a body upon said support and said unit synchronously, and independently operated means to lock said oscillator to said base and said member to said oscillator.

29. A balancing machine, comprising a base, an oscillatory member pivotably mounted upon said base, resilient means to yieldingly position the same, a member having a support for a body to be balanced pivotably mounted upon said oscillatory member, the plane of the pivot of one member being disposed at an angle to the plane of the pivot of the other member, resilient means to yieldingly position said second member, a balancing unit carried by said second member, means also carried by said second member and operative to rotate a body upon said support and said unit synchronously, and means to prevent the vibrations of said second member at will, while the system comprising said unit and a body upon said support is unbalanced and revolving.

30. A balancing machine, comprising a base, an oscillatory member pivotably mounted upon said base, a member having a support for a body to be balanced pivotably mounted upon said oscillatory member, the plane of the pivot of one member being disposed at an angle to the plane of the pivot of the other member, a balancing unit carried by said second member, means also carried by said second member and operative to rotate a body upon said support and said unit synchronously, means to adjust said unit to balance a body upon said support while said unit and said body are in motion, and means to positively indicate the adjustment of said unit.

31. A balancing machine, comprising a base, an oscillatory member, pivotably mounted upon said base, a member having a support for a body to be balanced pivotably mounted upon said oscillatory member, the plane of the pivot of one member being disposed at an angle to the plane of the pivot of the other member, a balancing unit carried by said second member, means also carried by said second member and operative to rotate a body upon said support and said unit synchronously, means to alter the angular relation of said unit with respect to said body while the same are in motion, and means to positively indicate the angular relation of said unit to said body.

32. A balancing machine, comprising a base, an oscillatory member pivotably mounted upon said base, a member having a support for a body to be balanced pivotably mounted upon said oscillatory member, the plane of the pivot of one member being disposed at an agle to the pivot of the other member, a balancing unit carried by said second member, means also carried by said second member and operative to rotate a body upon said support and said unit synchronously, means to adjust said unit to balance a body upon said support while said unit and said body are in motion, and means to positively indicate the condition of said unit continuously while both stationary and in motion.

33. A balancing machine, comprising a base, an oscillatory member pivotably mounted upon said base, a member having a support for a body to be balanced pivotably mounted upon said oscillatory member, the plane of the pivot of one member being disposed at an agle to the plane of the pivot of the other member, a balancing unit carried by said second member, means also carried by said second member and operative to rotate a body upon said support and said unit synchronously, means to alter the angular relation of said unit with respect to said body while the same are in motion, and means to positively indicate the angular relation of said unit to said body while both stationary and in motion.

34. A balancing machine, comprising a base, an oscillatory member pivotably mounted upon said base, a member having a support for a body to be balanced pivotably mounted upon said oscillatory member, the plane of the pivot of one member being disposed at an angle to the plane of the pivot of the other member, a balancing unit carried by said second member, means also carried by said second member and operative to rotate a body upon said support and said unit synchronously, means to adjust said unit to balance a body upon said support while said unit and said body are in motion, means to positively indicate the condition of said unit while both stationary and in motion, means to alter the angular relation of said unit with respect to said body while the same are in motion, and means to positively indicate the angular relation of said unit to said body while both stationary and in motion.

35. A balancing machine, comprising a base, an oscillatory member pivotably mounted upon said base, a member having a support for a body to be balanced pivotably mounted upon said oscillatory member, the plane of the pivot of one member being disposed at an angle to the plane of the pivot of the other member, a balancing unit carried by said second member, means also carried by said second member and operative to rotate a body upon said support and said unit synchronously, means to adjust said unit to balance a body upon said support, means to positively indicate the condition of said unit while both stationary and in motion, means to alter the angular relation of said unit with respect to said body while the same are in motion, and means to positively indicate the angular relation of said unit to said body while both stationary and in motion.

36. A balancing machine, comprising a base, an oscillatory member pivotably mounted upon said base, a member having a support for a body to be balanced pivotably mounted upon said oscillatory member, the plane of the pivot of one member being disposed at an angle to the plane of the pivot of the other member, a balancing unit carried by said second member, means also carried by said second member and operative to rotate a body upon said support and said unit synchronously, means to adjust said unit to balance a body upon said support, means to positively indicate the condition of said unit, means to alter the angular relation of said unit with respect to said body while the same are in motion, and means to positively indicate the angular relation of said unit to said body while both stationary and in motion.

37. A balancing machine, comprising a base, a member pivotably carried by said base and adapted to be locked thereto, an oscillatory member pivotably carried by said first member and adapted to be locked thereto, the plane of the pivot of one member being disposed at an angle to the plane of the pivot of the other member, a vertical support for a body to be tested carried by said oscillatory member, means carried by said oscillatory member and movable with and operative to balance a body upon said support, and means to rotate said means and a body upon said support synchronously.

38. A balancing machine, comprising a base, a member pivotably carried by said base, an oscillatory member pivotably carried by said member, the plane of the pivot of one member being disposed at an angle to the plane of the pivot of the other member, a vertical support for a body to be carried by said oscillatory member, means movable with and operative to balance a body upon said support, and means to rotate said means and a body upon said support synchronously.

39. A balancing machine, comprising a base, a member pivotably carried by said base and adapted to be locked thereto, an oscillatory member pivotably carried by said first member and adapted to be locked thereto, the plane of the pivot of one member being disposed at an angle to the plane of the pivot of the other member, a vertical support for a body to be tested carried by said oscillatory member, means carried by said oscillatory member and movable with and operative to balance a body upon said support, means to rotate said means and a body upon said support synchronously, and means to adjust said balancing means while the latter is rotating.

40. A balancing machine, comprising a base, a member pivotably carried by said base and adapted to be locked thereto, an oscillatory member pivotably carried by said first member and adapted to be locked thereto, the plane of the pivot of one member being disposed at an angle to the plane of the pivot of the other member, a vertical support for a body to be tested carried by said oscillatory member, means carried by said oscillatory member, and movable with and operative to balance a body upon said support, means to rotate said means and a body upon said support synchronously, and means to alter the angular relation of said balancing means with relation to said support or a body upon said support while the same are rotating.

41. A balancing machine, comprising a base, a member pivotally carried by said base and adapted to be locked thereto, an oscillatory member pivotably carried by said first member and adapted to be locked thereto, the plane of the pivot of one member being disposed at an angle to the plane of the pivot of the other member, a vertical support for a body to be tested carried by said oscillatory member, means carried by said oscillatory member and movable with and operative to balance a body upon said support, means to rotate said means and a body upon said support synchronously, means to adjust said balancing means while the latter is rotating, and means to alter the angular relation to said balancing means with relation to said support or a body upon said support while the same are rotating.

In testimony whereof I have affixed my signature.

JACOB LUNDGREN.